(12) United States Patent
Kim et al.

(10) Patent No.: US 9,422,826 B2
(45) Date of Patent: Aug. 23, 2016

(54) START CONTROL UNIT FOR STEAM TURBINE PLANT

(71) Applicant: Mitsubishi Hitachi Power Systems, Ltd., Yokohama-shi, Kanagawa (JP)

(72) Inventors: Eunkyeong Kim, Tokyo (JP); Yasuhiro Yoshida, Tokyo (JP); Takuya Yoshida, Tokyo (JP); Tatsuro Yashiki, Tokyo (JP); Nobuyuki Hokari, Yokohama (JP); Kenichiro Nomura, Yokohama (JP); Kazunori Yamanaka, Yokohama (JP); Fumiyuki Suzuki, Yokohama (JP); Masaaki Tomizawa, Yokohama (JP); Yuichi Takahashi, Yokohama (JP)

(73) Assignee: Mitsubishi Hitachi Power Systems, Ltd., Yokohama-shi (JP)

( * ) Notice: Subject to any disclaimer, the term of this patent is extended or adjusted under 35 U.S.C. 154(b) by 281 days.

(21) Appl. No.: 14/314,841

(22) Filed: Jun. 25, 2014

(65) Prior Publication Data

US 2014/0373540 A1    Dec. 25, 2014

(30) Foreign Application Priority Data

Jun. 25, 2013    (JP) ................... 2013-132214

(51) Int. Cl.
*F01D 19/02* (2006.01)
*F01K 13/02* (2006.01)
(Continued)

(52) U.S. Cl.
CPC ............. *F01D 19/02* (2013.01); *F01D 17/00* (2013.01); *F01D 17/085* (2013.01); *F01K 13/02* (2013.01); *F01K 23/101* (2013.01); *Y02E 20/16* (2013.01)

(58) Field of Classification Search
CPC ......... F01D 19/00; F01D 19/02; F01D 17/00; F01D 17/085; F01D 25/10; F01K 23/101; F01K 13/02
See application file for complete search history.

(56) References Cited

U.S. PATENT DOCUMENTS

| | | | | | |
|---|---|---|---|---|---|
| 3,588,265 | A | * | 6/1971 | Berry | F01K 7/24 415/1 |
| 3,928,972 | A | * | 12/1975 | Osborne | F01K 7/24 60/646 |

(Continued)

FOREIGN PATENT DOCUMENTS

| CN | 1834408 A | 9/2006 |
|---|---|---|
| CN | 101305163 A | 11/2008 |

(Continued)

OTHER PUBLICATIONS

Chinese Office Action issued in counterpart Chinese Application No. 201410286517.1 dated Jun. 25, 2015 (six (6) pages).

(Continued)

*Primary Examiner* — Thomas Denion
*Assistant Examiner* — Xiaoting Hu
(74) *Attorney, Agent, or Firm* — Crowell & Moring LLP

(57) ABSTRACT

A start control unit for a steam turbine plant, wherein inputting a measured value of a steam temperature fed to a steam turbine, a measured value or an estimated value of a rotor temperature of the steam turbine, and a measured value of a casing temperature of the steam turbine, and controlling a steam flow rate so as to increase the steam flow rate fed to the steam turbine when a difference between the steam temperature and the rotor temperature is smaller than a first regulated value and a difference between the rotor temperature and the casing temperature is a second regulated value or larger.

8 Claims, 7 Drawing Sheets

(51) Int. Cl.
*F01D 17/08* (2006.01)
*F01D 17/00* (2006.01)
*F01K 23/10* (2006.01)

(56) References Cited

U.S. PATENT DOCUMENTS

| | | | |
|---|---|---|---|
| 4,173,869 A * | 11/1979 | Martin, Jr. | ............... F01D 19/02 415/17 |
| 4,181,840 A | 1/1980 | Osborne | |
| 4,418,539 A | 12/1983 | Wakamatsu et al. | |
| 5,433,079 A | 7/1995 | Badami et al. | |
| 2005/0085949 A1 * | 4/2005 | Kirchhof | ................. F01D 19/02 700/290 |
| 2006/0233637 A1 | 10/2006 | Yakushi et al. | |
| 2009/0126365 A1 | 5/2009 | Gobrecht et al. | |
| 2009/0288416 A1 * | 11/2009 | Matsumoto | ............. F01D 19/02 60/646 |
| 2012/0144839 A1 | 6/2012 | Ehrsam et al. | |

FOREIGN PATENT DOCUMENTS

| | | |
|---|---|---|
| CN | 101586479 A | 11/2009 |
| DE | 32 00 952 A1 | 1/1983 |
| JP | 58-197408 A | 11/1983 |
| JP | 61-116007 A | 6/1986 |
| JP | 3-70804 A | 3/1991 |
| JP | 2009-281248 A | 12/2009 |
| WO | WO 98/26336 A1 | 6/1998 |

OTHER PUBLICATIONS

Extended European Search Report dated Jun. 10, 2015 (six (6) pages).

* cited by examiner

FIG. 5

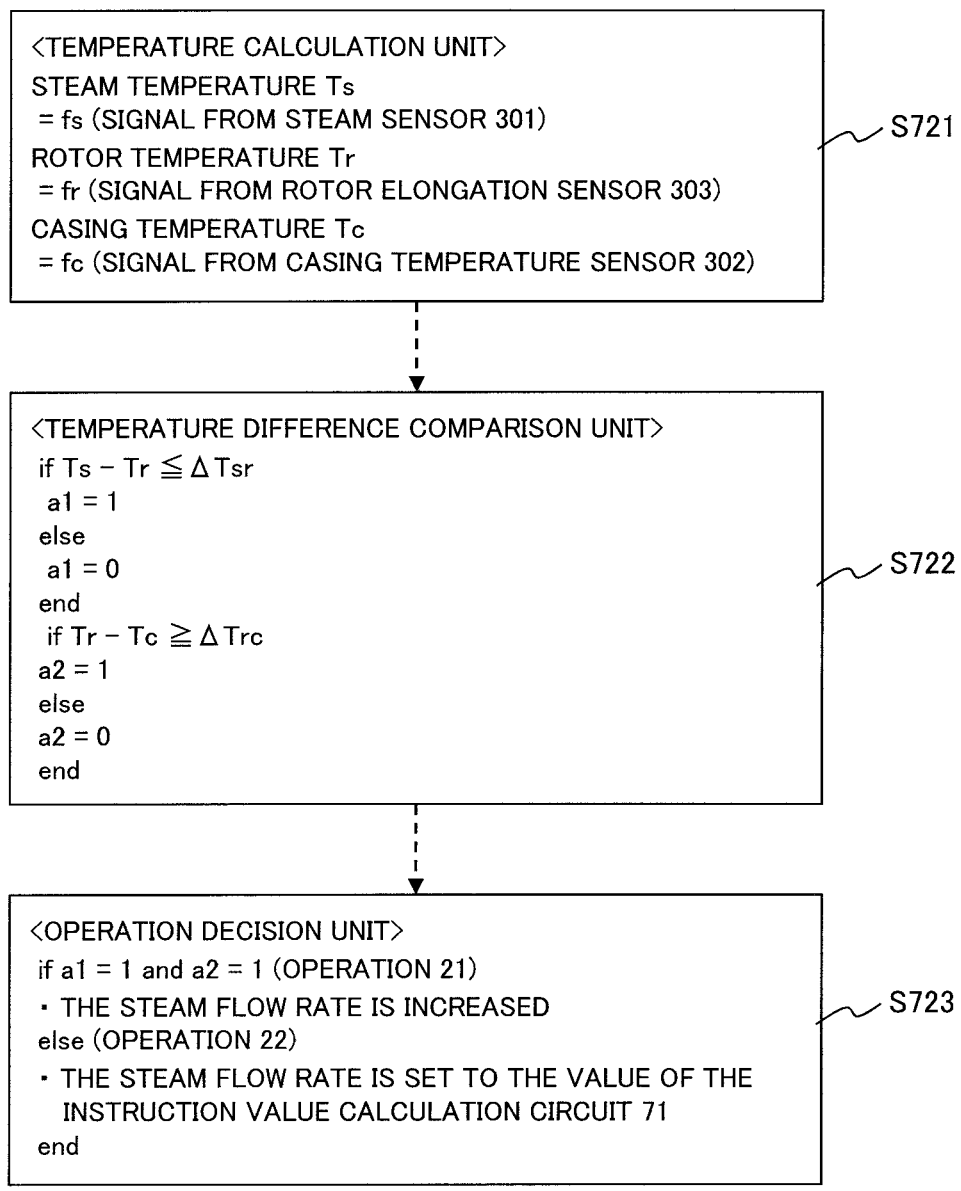

S721 — <TEMPERATURE CALCULATION UNIT>
STEAM TEMPERATURE Ts
 = fs (SIGNAL FROM STEAM SENSOR 301)
ROTOR TEMPERATURE Tr
 = fr (SIGNAL FROM ROTOR ELONGATION SENSOR 303)
CASING TEMPERATURE Tc
 = fc (SIGNAL FROM CASING TEMPERATURE SENSOR 302)

S722 — <TEMPERATURE DIFFERENCE COMPARISON UNIT>
if Ts − Tr ≦ ΔTsr
 a1 = 1
else
 a1 = 0
end
 if Tr − Tc ≧ ΔTrc
a2 = 1
else
a2 = 0
end S723 — <OPERATION DECISION UNIT>
if a1 = 1 and a2 = 1 (OPERATION 21)
 • THE STEAM FLOW RATE IS INCREASED
else (OPERATION 22)
 • THE STEAM FLOW RATE IS SET TO THE VALUE OF THE INSTRUCTION VALUE CALCULATION CIRCUIT 71
end

START CONTROL UNIT FOR STEAM TURBINE PLANT

CLAIM OF PRIORITY

The present application claims priority from Japanese patent application serial No. 2013-132214, filed on Jun. 25, 2013, the content of which is hereby incorporated by reference into this application.

BACKGROUND OF THE INVENTION

1. Technical Field

The present invention relates to a start control unit for a steam turbine plant.

2. Background Art

In recent years, to preserve fossil resources, power generation facilities using renewable energy such as wind power and sunlight are increasing. However, the power generation quantity from these kinds of renewable energy varies greatly depending on the weather and season. To promptly supplement such variations in the power quantity and stabilize the power system, power generation facilities such as a combined cycle power generation plant and a coal burning power generation plant are required to start in a short period of time. One of the methods of starting the power generation plant in a short period of time is to quicken the start of the steam turbine which is a component of the power generation plant (hereinafter referred to as high-speed start).

The steam turbine includes a rotor which is a rotating body and a casing for surrounding the rotor as components. Upon starting the steam turbine, high-temperature steam is fed, the casing and rotor are heated by the heat of the high-temperature steam, and elongation is generated in both the casing and the rotor due to the thermal expansion (this elongation is hereinafter referred to as thermal elongation). Here, generally, due to the causes such that the casing is higher in the thermal capacity than the rotor and that the casing discharges heat into the atmosphere via an insulation material, the casing has a tendency to become delayed in the thermal elongation at the time of start than the rotor. As a result, if the thermal elongation difference becomes excessive, there is a possibility that the casing which is a stationary portion and the rotor which is a rotating portion will come into contact with each other, which can cause a reduction in the reliability or performance of the device.

As a countermeasure for it, conventionally, a method is proposed of reducing the thermal elongation difference between the casing and the rotor by estimating the thermal elongation difference generated by the steam turbine between the casing and the rotor and then controlling the steam flow rate so that the estimated value will be suppressed to the regulated value or smaller (for example, Patent Literature 1).

CITATION LIST

Patent Literature

{Patent Literature 1}
Japanese Patent Laid-open No. 2009-281248

SUMMARY OF INVENTION

Technical Problem

An object of the present invention is to provide a start control unit for a steam turbine plant which requires no complicated calculation such as a thermal elongation difference estimate and suppresses the thermal elongation difference to the regulated value or smaller by a simple method.

Solution to Problem

To accomplish the above object, in the present invention, a start control unit for a steam turbine plant, characterized by inputting a measured value of a steam temperature fed to a steam turbine, a measured value or an estimated value of a rotor temperature of the steam turbine, and a measured value of a casing temperature of the steam turbine, and controlling a steam flow rate so as to increase the steam flow rate fed to the steam turbine when a difference between the steam temperature and the rotor temperature is smaller than a first regulated value and a difference between the rotor temperature and the casing temperature is a second regulated value or larger.

Also, to accomplish the above object, in the present invention, a start control unit for a steam turbine plant, characterized by inputting a measured value of a steam temperature fed to a steam turbine, a measured value or an estimated value of a rotor temperature of the steam turbine, and a measured value of a casing temperature of the steam turbine; controlling the steam temperature and the steam flow rate fed to the steam turbine so as to be held within a predetermined ranges when the difference between the steam temperature and the rotor temperature is the first regulated value or larger and the difference between the rotor temperature and the casing temperature is the second regulated value or larger; and thereafter, controlling the steam temperature and the steam flow rate so as to increase the steam flow rate fed to the steam turbine when the difference between the steam temperature and the rotor temperature becomes smaller than the first regulated value and the difference between the rotor temperature and the casing temperature is held at the second regulated value or larger, while holding the steam temperature within a predetermined range.

Also, to accomplish the above object, in the present invention, a combined cycle power generation plant having a gas turbine, an exhaust heat recovery boiler to generate steam using exhaust heat of the gas turbine, and a steam turbine driven by the steam generated by the exhaust heat recovery boiler, wherein: the gas turbine has a fuel flow rate adjusting valve to adjust the fuel flow rate fed to the gas turbine, the steam turbine has a steam flow rate adjusting valve to adjust the steam flow rate fed from the exhaust heat recovery boiler, and a start control unit is provided to input a measured value of a steam temperature fed to the steam turbine, a measured value or an estimated value of a rotor temperature of the steam turbine, and a measured value of a casing temperature of the steam turbine, and output instruction values of the fuel flow rate adjusting valve and the steam flow rate adjusting valve, wherein: the start control unit controls the fuel flow rate adjusting valve and the steam flow rate adjusting valve so as to hold the steam temperature and the steam flow rate within predetermined ranges, when a difference between the steam temperature and the rotor temperature is a first regulated value or larger and a difference between the rotor temperature and the casing temperature is a second regulated value or larger, and thereafter, and controls the steam flow rate adjusting valve so as to increase the steam flow rate while controlling the fuel adjusting valve so as to hold the steam temperature within a predetermined range, when the difference between the steam temperature and the rotor temperature becomes smaller than the first regulated value and the difference between the rotor temperature and the casing temperature is held at the second regulated value or larger.

Also, to accomplish the above object, in the present invention, a start control method for a combined cycle power generation plant having a gas turbine, an exhaust heat recovery boiler to generate steam using exhaust heat of the gas turbine, a steam turbine driven by the steam generated by the exhaust heat recovery boiler and having a fuel flow rate adjusting valve to adjust the fuel flow rate fed to the gas turbine and a steam flow rate adjusting valve to adjust the steam flow rate fed from the exhaust heat recovery boiler to the steam turbine, wherein the start control method including: a process for outputting instruction values of the fuel flow rate adjusting valve and the steam flow rate adjusting valve so as to hold the steam temperature and the steam flow rate within predetermined ranges, when a difference between a steam temperature fed to the steam turbine and a rotor temperature of the steam turbine is a first regulated value or larger and a difference between the rotor temperature and a casing temperature of the steam turbine is a second regulated value or larger, and a process for outputting the instruction value of the steam flow rate adjusting valve so as to increase the steam flow rate while outputting the instruction value of the fuel adjusting valve so as to hold the steam temperature within the predetermined range, when the difference between the steam temperature and the rotor temperature becomes smaller than the first regulated value and the difference between the rotor temperature and the casing temperature is held at the second regulated value or larger.

Advantageous Effects of Invention

According to the present invention, a start control unit for a steam turbine plant which requires no complicated calculation such as a thermal elongation difference estimate and suppresses the thermal elongation difference to a regulated value or smaller by a simple method can be provided.

BRIEF DESCRIPTION OF DRAWINGS

FIG. 5 is a processing flow chart of a start control unit shown in FIG. 4.

DESCRIPTION OF EMBODIMENTS

Figure 1:
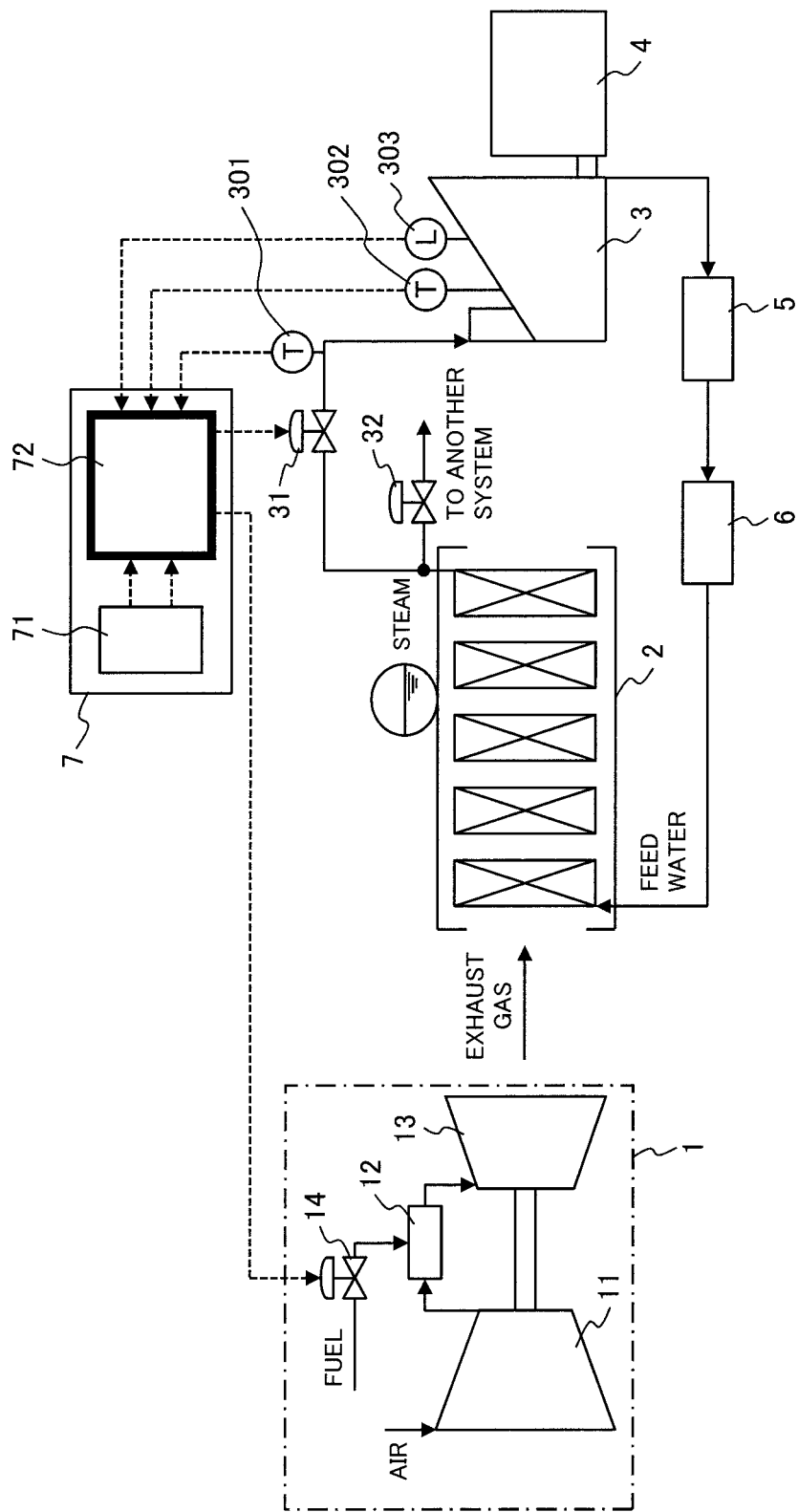
FIG. 1 is a system block diagram of a steam turbine plant showing a first embodiment of the present invention.

The present invention is realized due to the aiming at the properties described below by the inventors.

(1) At the time of plant start, the steam temperature rises to a certain decided value (for example, temperature at the rated load), and the rotor temperature follows it and approaches an almost similar temperature zone, and then the rotor temperature reaches an almost stationary state, so that the thermal elongation is practically almost fixed.

(2) However, at the timing of (1) above, the casing still continues the temperature rise and the thermal elongation of the casing increases continuously.

(3) In (1) above, until the point of time when the rotor temperature reaches a temperature near the steam temperature, the thermal elongation difference between the rotor and the casing increases continuously, and after the rotor temperature reaches a temperature near the steam temperature, the thermal elongation difference reduces.

By taking into account of the properties of (1) and (2) mentioned above, after the rotor temperature follows a temperature near the steam temperature, increasing the flow rate only while keeping the steam temperature allows raising the casing temperature only. By doing this, the thermal elongation difference caused by the temperature difference between the rotor and the casing can be reduced, and, by quickening the temperature rise of the casing, not only the temperature rise but also the start of the whole plant can be quickened.

Further, in addition to (1) and (2) mentioned above, by taking into account of the property of (3) mentioned above, at the point of time when the rotor temperature reaches a temperature near the steam temperature, the thermal elongation difference is apt to become a peak value. Therefore, at a timing earlier by a given period of time than the arrival of the rotor temperature at a temperature near the steam temperature, if only the flow rate is increased with the steam temperature kept, the peak value of the thermal elongation difference can be reduced. Here, "a timing earlier by a given period of time" indicates, in the process during which the rotor temperature approaches the steam temperature, the timing at which the reducing speed (the temperature reduction range per hour) of the temperature difference between the rotor temperature and the steam temperature becomes smaller than or equal to a certain fixed value. The reducing speed of the temperature difference between the steam and the rotor is apt to reduce in the course of time, so that when it is within a range smaller than a fixed value, the steam flow rate can be increased so as to increase the casing temperature rise while the rotor temperature rise is practically suppressed small.

To realize these, in the present invention, when the difference between the steam temperature and the rotor temperature is smaller than the first regulated value and the difference between the rotor temperature and the casing temperature is the second regulated value or larger, control is performed so as to increase the flow rate of the steam to be fed to the steam turbine (hereinafter called steam flow rate).

Hereinafter, the embodiments of the present invention will be explained by referring to the drawings.

{First Embodiment}

Hereinafter, the first embodiment of the present invention will be explained by referring to FIGS. 1 to 3. Further, in this embodiment, as a steam turbine plant, a combined cycle power generation plant with the gas turbine and the steam turbine combined will be explained as an example.

Figure 2:
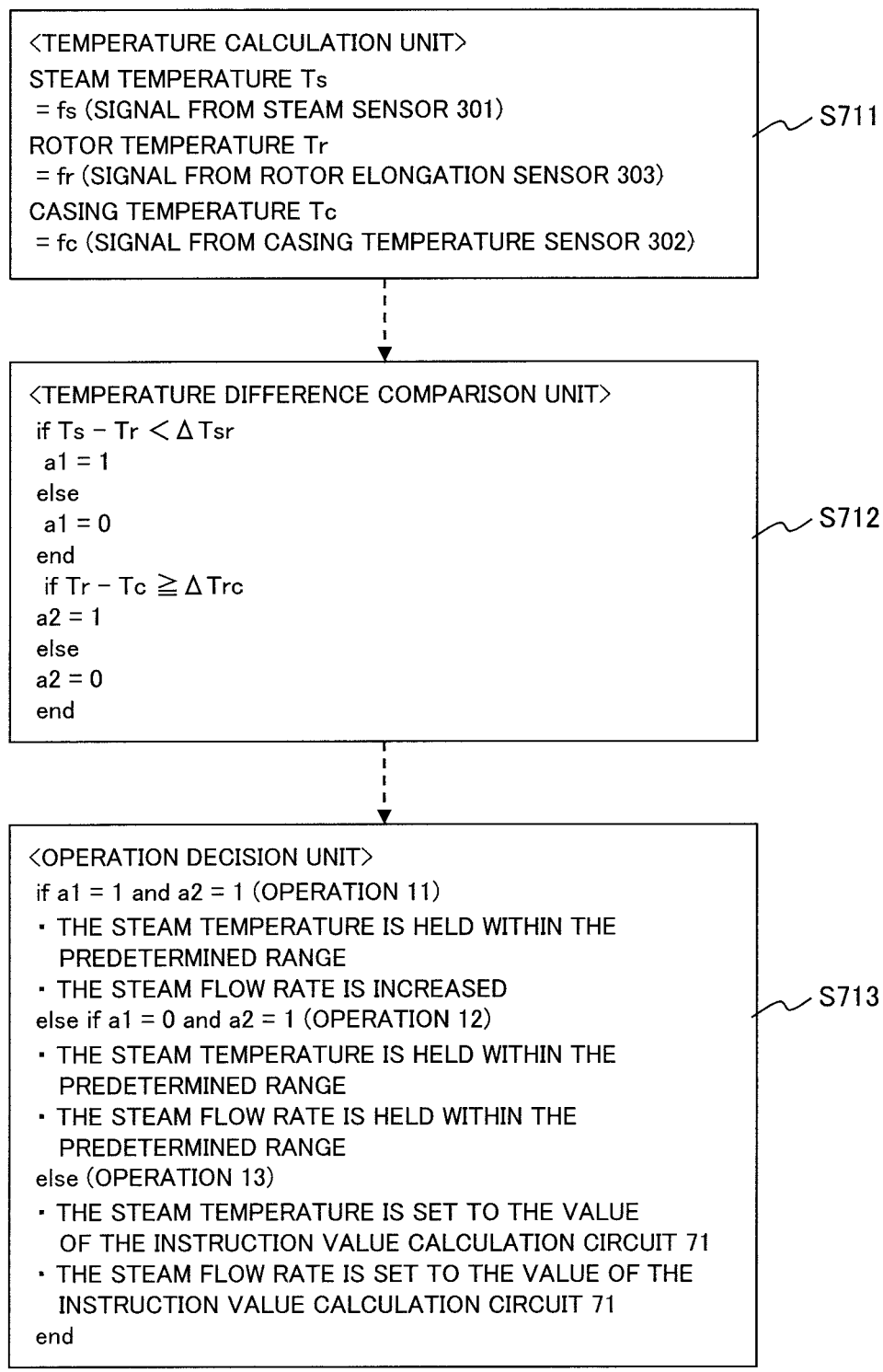
FIG. 2 is a processing flow chart of a start control unit shown in FIG. 1.
Figure 3:
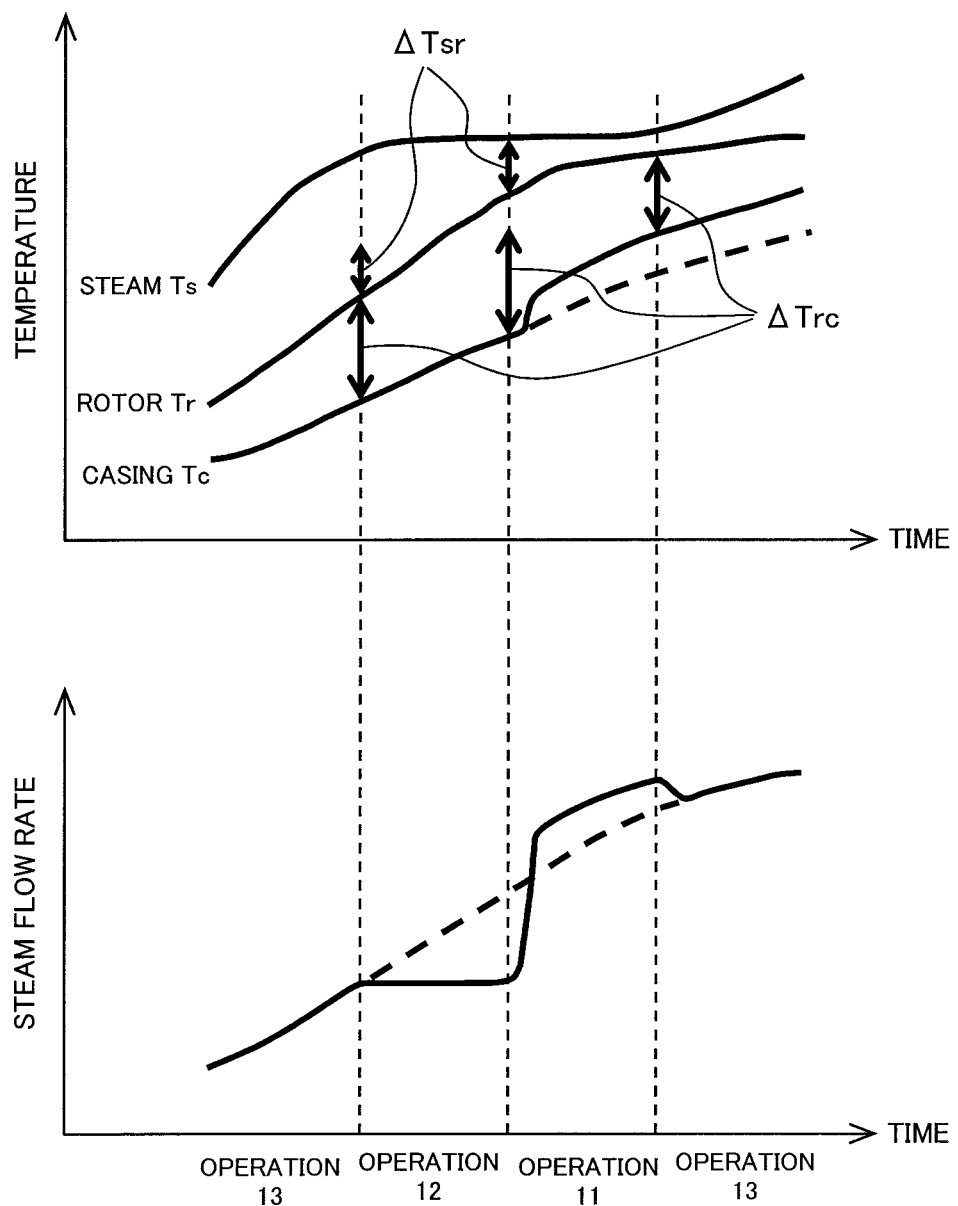
FIG. 3 is a characteristic diagram showing the variations in the steam temperature and the steam flow rate in the steam turbine plant shown in FIG. 1.

FIG. 1 is a system block diagram of a steam turbine plant, and FIG. 2 is a processing flow chart of a start control unit shown in FIG. 1, and FIG. 3 is a characteristic diagram showing the variations in the steam temperature and steam flow rate in the steam turbine plant shown in FIG. 1.

FIG. 1 shows the system of the combined cycle power generation plant including a gas turbine 1, an exhaust heat recovery boiler 2, a steam turbine 3, a generator 4, a condenser 5, and a water feed pump 6.

In FIG. 1, the gas turbine 1 is configured by a compressor 11, a combustor 12, and a turbine 13, and a drive shaft (omitted in the drawing). The compressor 11 sucks and pressurizes air and feeds it to the combustor 12 as combustion air. The combustor 12 mixes the combustion air with fuel, burns the mixed fuel, and generates high-temperature combustion gas. The combustion gas drives the turbine 13 and drives the compressor 11, the steam turbine 3, and the generator 4 via the drive shaft.

The exhaust heat recovery boiler 2 heat-exchanges exhaust gas from the gas turbine 1 and feed water to generate steam and feeds the steam to the steam turbine 3. The feed water fed to the exhaust heat recovery boiler 2 is stored in the lower portion of the condenser 5 and is pumped to the exhaust heat recovery boiler 2 by the water feed pump 6. The exhaust gas from the gas turbine 1, after heat exchange with the feed water, is discharged into the atmosphere from a stack (not shown).

The steam turbine 3 is driven by introduction of the steam generated by the exhaust heat recovery boiler 2. The steam worked by the steam turbine 3 is condensed by the condenser 5 and then is flowed back to the exhaust heat recovery boiler 2 by the water feed pump 6.

The generator 4 is connected to the steam turbine 3 by the drive shaft, is driven by the gas turbine 1 and the steam turbine 3, and sends the generated power to the electric system.

Further, as mentioned above, for the generator 4, an example that it is connected only to the steam turbine 3 by the drive shaft (the gas turbine 1 is connected to another generator (not shown)) is shown, though it may be connected to both of the gas turbine 1 and the steam turbine 3.

A fuel flow rate adjusting valve 14 adjusts the flow rate of fuel fed to the combustor 12, and a steam flow rate adjusting valve 31 adjusts the steam flow rate fed to the steam turbine 3, and a bypass valve 32 adjusts the steam flow rate branching from the upstream side of the steam flow rate adjusting valve 31 to another system.

A start control unit 7 includes an instruction value calculation circuit 71 and a temperature difference reduction control circuit 72. The instruction value calculation circuit 71, on the basis of a well-known algorithm, at the start of the steam turbine, calculates an instruction value to the fuel flow rate adjusting valve 14 and an instruction value to the steam flow rate adjusting valve 31 and outputs them to the temperature difference reduction control circuit 72. The temperature difference reduction control circuit 72, so as to suppress the difference between the rotor temperature and the casing temperature, corrects the instruction value to the fuel flow rate adjusting valve 14 and the instruction value to the steam flow rate adjusting valve 31 and outputs them to the respective adjusting valves.

Next, the start control unit 7 constituting a part of the first embodiment will be explained.

The operation of the temperature difference reduction control circuit 72 at the start of the steam turbine will be explained by referring to FIGS. 2 and 3. The temperature difference reduction control circuit 72, as shown in FIG. 2, includes a temperature calculation unit S711, a temperature difference comparison unit S712, and an operation decision unit S713.

The temperature calculation unit S711, on the basis of a signal from a steam temperature measuring sensor 301, a signal from a rotor elongation sensor 303, and a signal from a casing temperature sensor 302, calculates the steam temperature Ts, rotor temperature Tr, and casing temperature Tc.

The temperature difference comparison unit S712 judges whether the difference between the steam temperature Ts and the rotor temperature Tr is smaller than the regulated value or not and judges whether the difference between the rotor temperature Tr and the casing temperature Tc is the regulated value or larger.

The operation decision unit S713, when the difference between the steam temperature Ts and the rotor temperature Tr is smaller than the first regulated value ($\Delta Tsr$) and the difference between the rotor temperature Tr and the casing temperature Tc is the second regulated value ($\Delta Trc$) or larger, while an instruction value is output to the fuel flow rate adjusting valve 14 so as to hold the steam temperature within a predetermined range, outputs an instruction value to the steam flow rate adjusting valve 31 so as to increase the steam flow rate. Further, when the difference between the steam temperature Ts and the rotor temperature Tr is the first regulated value ($\Delta Tsr$) or larger and the difference between the rotor temperature Tr and the casing temperature Tc is the second regulated value ($\Delta Trc$) or larger, the operation decision unit S713 outputs instruction values to the fuel flow rate adjusting valve 14 and the steam flow rate adjusting valve 31, respectively, so as to hold the steam temperature and the steam flow rate within predetermined ranges.

Hereinafter, the temperature calculation unit S711 to the operation decision unit S713 will be explained.

The temperature calculation unit S711 inputs the signal from the steam temperature measuring sensor 301, the signal from the rotor elongation sensor 303, and the signal from the casing temperature sensor 302, calculates the steam temperature Ts by the signal from the steam temperature measuring sensor 301, calculates the rotor temperature Tr by the signal from the rotor elongation sensor 303, calculates the casing temperature Tc by the signal from the casing temperature sensor 302, and outputs the steam temperature, rotor temperature, and casing temperature to the temperature difference comparison unit S712.

As a method of calculating the rotor temperature by the signal from the rotor elongation sensor 303, for example, there are a method using the temperature variation calculated by dividing the rotor elongation by the linear expansion coefficient and a method of using a table and a function showing the relation of elongation and temperature which are prepared beforehand based on the theory or experience.

The temperature difference comparison unit S712 inputs the steam temperature Ts, rotor temperature Tr, and casing temperature Tc which are output from the temperature calculation unit S711, and when the difference between the steam temperature Ts and the rotor temperature Tr is judged as smaller than the regulated value ($\Delta Tsr$), assumes a state expression signal a1 as 1, and when it is judged as the regular value ($\Delta Tsr$) or larger, assumes the state expression signal a1 as 0, outputs them to the operation decision unit S713, and when the difference between the rotor temperature Tr and the casing temperature Tc is judged as the regulated value ($\Delta Trc$) or larger, assumes a state expression signal a2 as 1, and when it is judged as smaller than the regulated value ($\Delta Trc$), assumes the state expression signal a2 as 0, and outputs them to the operation decision unit S713.

The operation decision unit S713 inputs the state expression signal a1, the state expression signal a2, the instruction value to the steam temperature adjusting means from the instruction value calculation circuit 71, and the instruction value to the steam flow rate adjusting means from the instruction value calculation circuit 71, divides the case based on the state expression signal a1 and the state expression signal a2, and operates as indicated below.

Operation 11) When the state expression signal a1 and the state expression signal a2 are judged as 1, the operation decision unit S713 outputs an instruction value to the fuel flow rate adjusting valve 14 so as to hold the steam temperature within the predetermined range, and outputs an instruction value to the steam flow rate adjusting valve 31 so as to increase the steam flow rate.

Here, the predetermined range is obtained by adding the allowable bias to the value of the steam temperature at the time when the state expression signal a1 and the state expression signal a2 are judged as 1.

As a concrete operation method, for example, there is a method available of outputting the instruction value from the instruction value calculation circuit 71 to the fuel flow rate adjusting valve 14 by holding it at the value at the time when the state expression signal a1 and the state expression signal a2 are judged as 1 and by adding or multiplying a predetermined coefficient to the instruction value from the instruction value calculation circuit 71 to the steam flow rate adjusting valve 31.

Operation 12) When the state expression signal a1 is judged as 0 and the state expression signal a2 is judged as 1, the operation decision unit S713 outputs instruction values to the fuel flow rate adjusting valve 14 and the steam flow rate adjusting valve 31 so as to hold the steam temperature and steam flow rate within the predetermined ranges.

Here, the predetermined range is obtained by adding biases to the respective values of the steam temperature and the steam flow rate at the time when the state expression signal a1 is judged as 0 and the state expression signal a2 is judged as 1.

Operation 13) In other cases, the operation decision unit S713 outputs the instruction value from the instruction value calculation circuit 71 to the fuel flow rate adjusting valve 14 and the instruction value from the instruction value calculation circuit 71 to the steam flow rate adjusting valve 31 as they are.

In the temperature calculation unit S711, in a power generation plant without the rotor elongation sensor 303 and the casing temperature sensor 302 provided, by a signal from the steam temperature measuring sensor 301, the rotor temperature and casing temperature may be inferred.

In the first embodiment, as a steam temperature adjusting means, the case that the fuel flow rate adjusting valve 14 is used is described, though for example, the bypass valve 32, a spray valve (omitted in the drawing) to steam, or a spray valve to exhaust gas may be used.

When the temperature difference reduction control circuit 72 is used, as shown in FIG. 3, when the rotor and casing are heated by steam heat (Operation 13 on the left side in the drawing), that is, when the rotor temperature Tr and casing temperature Tc are not raised to a temperature near the steam temperature Ts, and the rotor temperature Tr rises in temperature earlier than the casing temperature Tc, and the difference between the rotor temperature Tr and the casing temperature Tc becomes the regulated value (the second regulated value ΔTrc) or larger, the steam temperature and steam flow rate are held within predetermined ranges (Operation 12), thus the increase of the difference between the rotor temperature Tr and the casing temperature Tc can be reduced.

Thereafter, when the rotor temperature Tr rises to a temperature near the steam temperature Ts (the state where the difference between the steam temperature Ts and the rotor temperature Tr is smaller than the first regulated value ΔTsr) but the casing temperature Tc rises only to a more lower temperature than the rotor temperature Tr (the state that the difference between the rotor temperature Tr and the casing temperature Tc is the second regulated value ΔTrc or larger), while holding the steam temperature within the predetermined range, the steam flow rate is increased (Operation 11), thus only the relatively low casing temperature Tc can be raised selectively.

As a result, the temperature difference (the thermal elongation difference) between the casing and the rotor can be reduced. Further, by aiming at the steam, rotor, and casing in temperature in this way, there is no need of complicated processes such as an estimate of the thermal elongation difference between the rotor and the casing and the thermal elongation difference between the rotor and the casing can be suppressed effectively. As a result, the reduction in the device reliability and performance can be avoided.

As mentioned above, this embodiment is characterized in that the steam conditions (temperature, flow rate, pressure) provided to the steam turbine are adjusted so that the rotor temperature follows the steam temperature when the rotor and casing are heated by the steam heat and the heat transfer to the casing will be promoted when the casing temperature does not follow the steam temperature. Concretely, when the difference between the steam temperature and the rotor temperature is smaller than the regulated value and the difference between the rotor temperature and the casing temperature is the regulated value or larger, the steam flow rate is increased within the allowable range while the steam temperature is held within the predetermined range. If the steam flow rate is increased, the heat transfer from the steam to the casing can be promoted. As a result, the temperature difference (thermal elongation difference) between the rotor and the casing can be suppressed effectively and the reduction in the device reliability and performance can be avoided.

According to this embodiment, when the rotor and casing are heated by the heat possessed by the steam at the start time and when the rotor temperature rises to a temperature near the steam temperature and the casing temperature stays at a more lower temperature than the rotor temperature, the steam flow rate is increased, thus only the casing temperature can be raised selectively. By doing this, the thermal elongation difference caused by the temperature difference between the rotor and the casing can be reduced effectively.

Further, by aiming at the steam, rotor, and casing in temperature in this way, there is no need of complicated processes such as an estimate of the thermal elongation difference between the rotor and the casing and the thermal elongation difference between the rotor and the casing can be suppressed effectively.

{Second Embodiment}

Hereinafter, the second embodiment of the present invention will be explained by referring to FIGS. 4 to 6.

Figure 4:
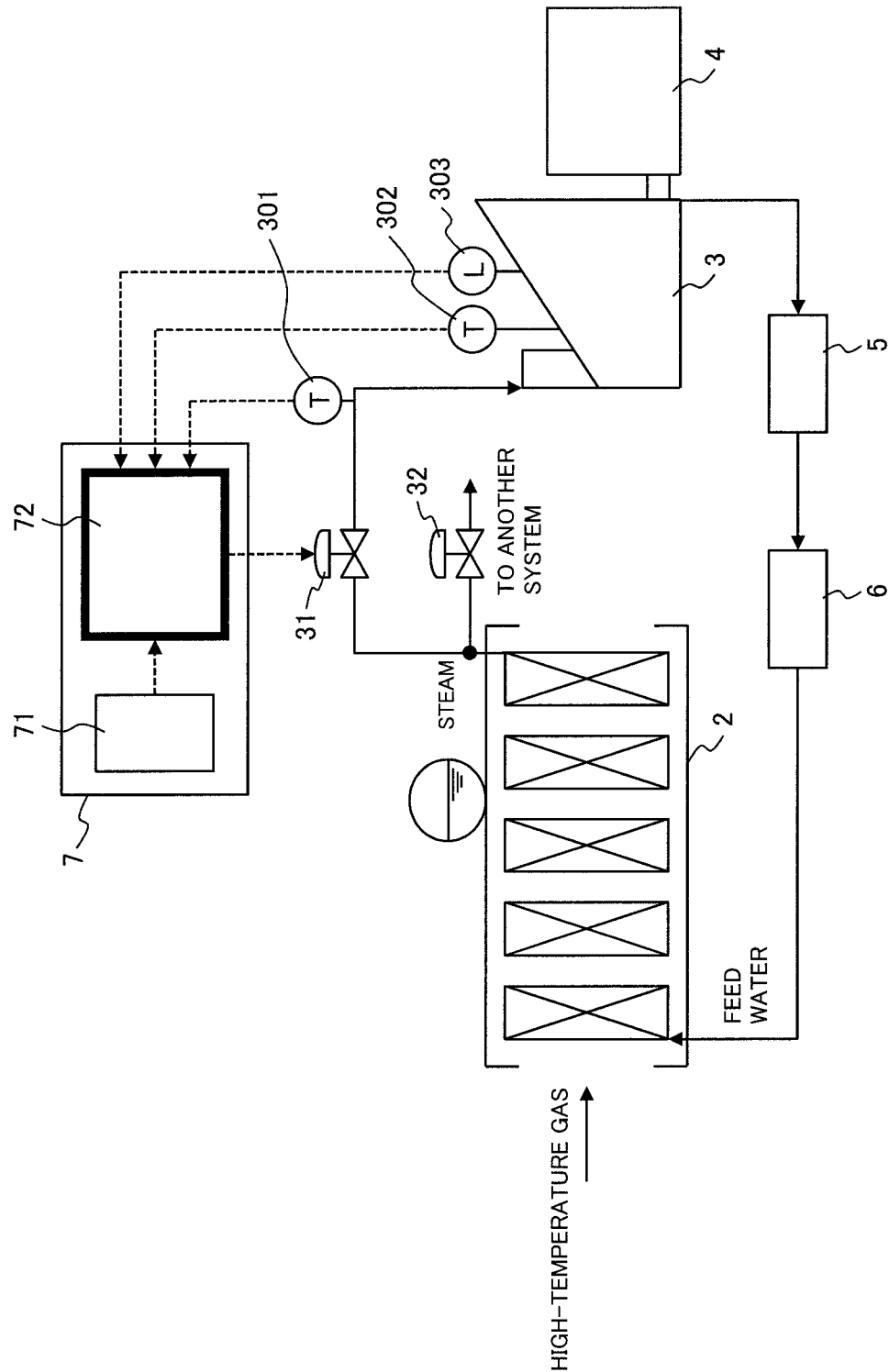
FIG. 4 is a system block diagram of a steam turbine plant showing a second embodiment of the present invention.
Figure 6:
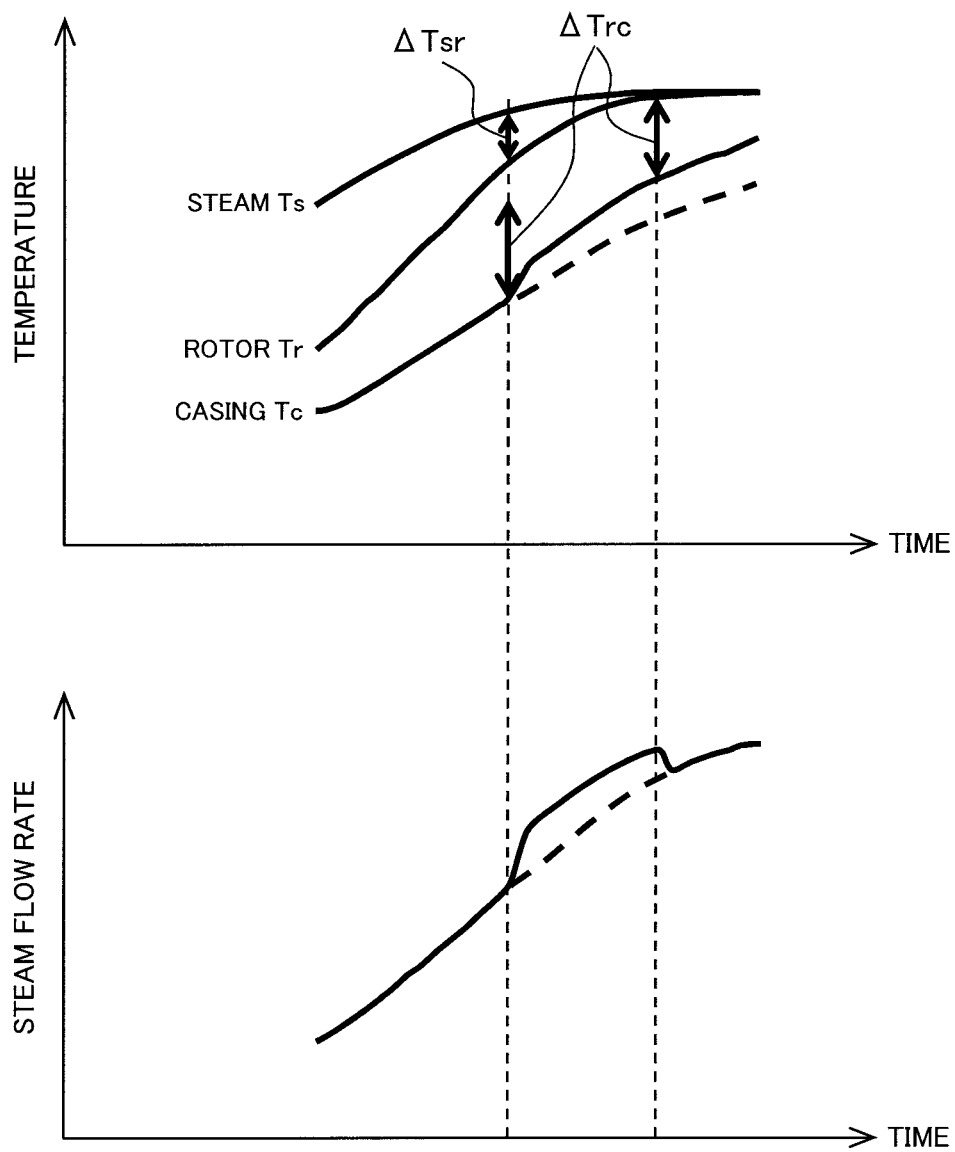
FIG. 6 is a characteristic diagram showing the variations in the steam temperature and the steam flow rate in the steam turbine plant shown in FIG. 4.

FIG. 4 is a system block diagram of the steam turbine plant of this embodiment, and FIG. 5 is a processing flow chart of the start control unit shown in FIG. 4, and FIG. 6 is a characteristic diagram showing the variations in the steam temperature and steam flow rate in the steam turbine plant shown in FIG. 4.

FIG. 4 shows the system of the steam turbine power generation plant including the exhaust heat recovery boiler 2, the steam turbine 3, the generator 4, the condenser 5, and the water feed pump 6. In FIG. 4, the same symbol as a symbol shown in FIG. 1 indicates the same part, so that the detailed explanation thereof will be omitted.

The operation of the temperature difference reduction control circuit 72 at the start of the steam turbine will be explained by referring to FIGS. 5 and 6.

The temperature difference reduction control circuit 72, as shown in FIG. 5, includes a temperature calculation unit S721, a temperature difference comparison unit S722, and an operation decision unit S723.

The temperature calculation unit S721 and the temperature difference comparison unit S722 are the same parts as the temperature calculation unit S711 and the temperature difference comparison unit S712 of the first embodiment, so that the detailed explanation thereof will be omitted and the operation decision unit S723 will be explained.

The operation decision unit S723, when the difference between the steam temperature Ts and the rotor temperature Tr is smaller than the regulated value (ΔTsr) and the difference between the rotor temperature Tr and the casing temperature Tc is the regulated value (ΔTrc) or larger, outputs an instruction value to the steam flow rate adjusting valve 31 so as to increase the steam flow rate.

The operation decision unit S723 inputs the state expression signal a1 and the state expression signal a2 which are outputted from the temperature difference comparison unit S722 and the instruction value to the steam flow rate adjusting valve 31 from the instruction value calculation circuit 71, divides the case based on the state expression signal a1 and the state expression signal a2, and operates as indicated below.

Operation 21) When the state expression signal a1 and the state expression signal a2 are judged as 1, the operation decision unit S723 outputs an instruction value to the steam flow rate adjusting valve 31 so as to increase the steam flow rate.

Operation 22) In other cases, the operation decision unit S713 outputs the instruction value to the steam flow rate adjusting valve 31 from the instruction value calculation circuit 71 as it is.

If the temperature difference reduction control circuit 72 is used, as shown in FIG. 6, when the rotor and casing are heated by the steam heat (Operation 22), the rise speed of the steam temperature is reduced and in the case where the rotor temperature rises to a temperature near the steam temperature but the casing temperature is raised only to a more lower temperature than the rotor temperature, the steam flow rate is increased (Operation 21), thus only the relatively low casing temperature can be raised selectively.

As a result, by fewer processes than the first embodiment, the similar effects to the first embodiment can be obtained simply.

{Third Embodiment}

Figure 7:
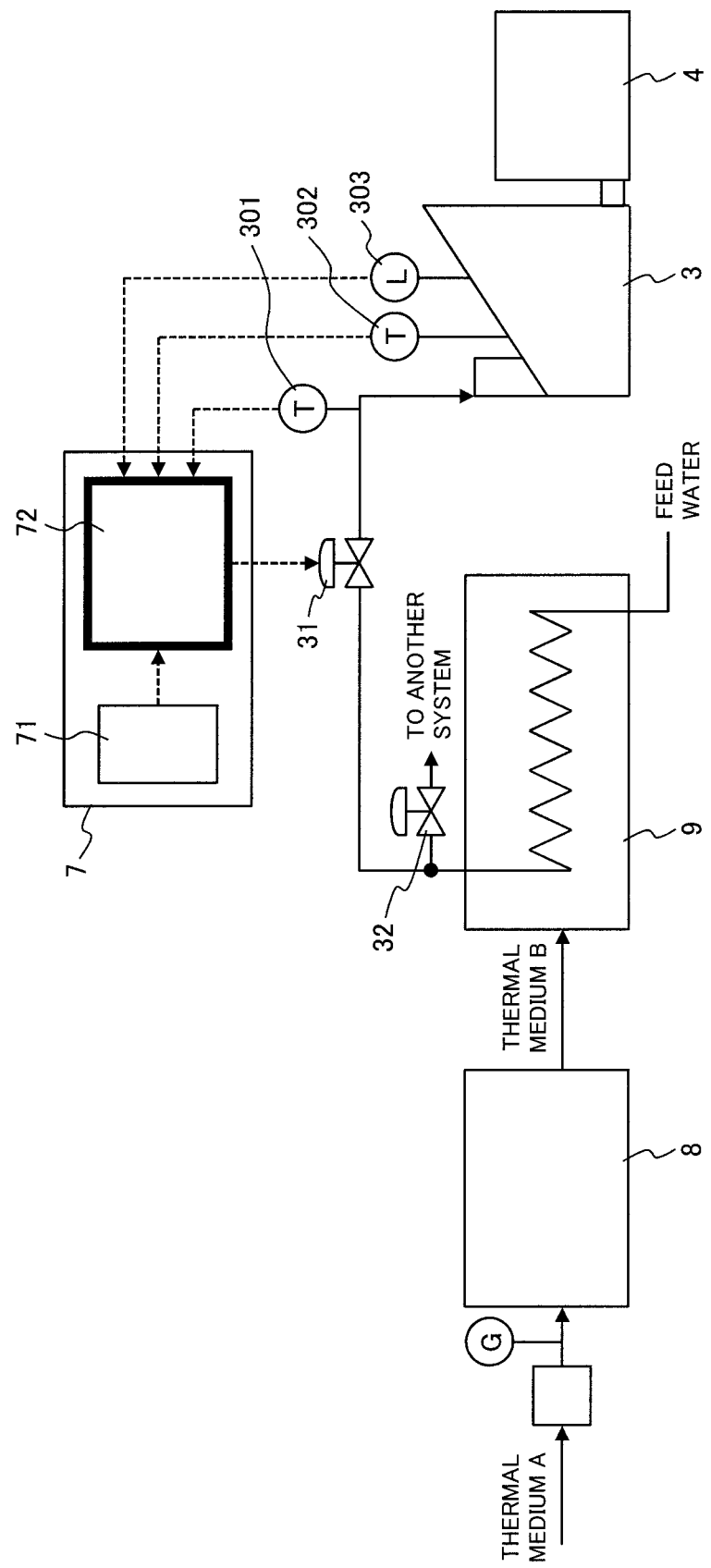
FIG. 7 is a system block diagram of a steam turbine plant showing a third embodiment of the present invention.

Hereinafter, the third embodiment of the present invention will be explained by referring to FIG. 7. FIG. 7 is a system block diagram of the steam turbine plant in this embodiment.

FIG. 7 shows the system of the power generation plant including a steam turbine having a heat source unit 8, a steam generator 9, the steam turbine 3, the generator 4, the condenser 5, and the water feed pump 6.

The heat source unit 8, using the quantity of heat held by the heat source medium, heats a low-temperature fluid and feeds it to the steam generator 9 as a high-temperature fluid. The steam generator 9, in the heat exchanger installed internally, gives the held heat of the high-temperature fluid to feed water and generates steam. By the steam generated in this way, the steam turbine 3 is driven and the drive force is converted to power by the generator 4 connected coaxially to the steam turbine 3.

In FIG. 7, the same symbol as a symbol shown in FIG. 1 indicates the same part, so that the detailed explanation thereof will be omitted.

In the system of the third embodiment, the similar effects to the first embodiment and the second embodiment can be obtained by providing the start control unit 7 or the temperature difference reduction control circuit 72 which are described in the first embodiment and the second embodiment.

The invention claimed is:

1. A method for controlling a start of a steam turbine plant, comprising:
    inputting a measured value of a steam temperature fed to a steam turbine, a measured value or an estimated value of a rotor temperature of the steam turbine, and a measured value of a casing temperature of the steam turbine, and
    controlling a steam flow rate so as to increase the steam flow rate fed to the steam turbine when a difference between the steam temperature and the rotor temperature is smaller than a first regulated value and a difference between the rotor temperature and the casing temperature is a second regulated value or larger.

2. The method of claim 1, wherein:
    the steam flow rate is controlled so as to be increased while holding the steam temperature within a predetermined range.

3. The method of claim 1, wherein:
    when the difference between the steam temperature and the rotor temperature is the first regulated value or larger and the difference between the rotor temperature and the casing temperature is the second regulated value or larger, the steam temperature and the steam flow rate are controlled so as to be held within predetermined ranges.

4. The method of claim 1, further including:
    inputting the measured value of the steam temperature fed to the steam turbine and a measured value of a rotor elongation of the steam turbine and inferring the rotor temperature.

5. A method for controlling a start of a steam turbine plant, comprising:
    inputting a measured value of a steam temperature fed to a steam turbine, a measured value or an estimated value of a rotor temperature of the steam turbine, and a measured value of a casing temperature of the steam turbine;
    controlling the steam temperature and a steam flow rate fed to the steam turbine so as to be held within predetermined ranges when the difference between the steam temperature and the rotor temperature is a first regulated value or larger and the difference between the rotor temperature and the casing temperature is a second regulated value or larger; and thereafter,
    controlling the steam temperature and the steam flow rate so as to increase the steam flow rate fed to the steam turbine when the difference between the steam temperature and the rotor temperature becomes smaller than the first regulated value and the difference between the rotor temperature and the casing temperature is held at the second regulated value or larger, while holding the steam temperature within the predetermined range.

6. The method of claim 5, further including:
    inputting the measured value of the steam temperature fed to the steam turbine and a measured value of a rotor elongation of the steam turbine and inferring the rotor temperature.

7. A combined cycle power generation plant having:
    a gas turbine, an exhaust heat recovery boiler to generate steam using exhaust heat of the gas turbine, and a steam turbine driven by the steam generated by the exhaust heat recovery boiler, wherein:
    the gas turbine has a fuel flow rate adjusting valve to adjust a fuel flow rate fed to the gas turbine,
    the steam turbine has a steam flow rate adjusting valve to adjust a steam flow rate fed from the exhaust heat recovery boiler, and
    a start control unit is provided to input a measured value of a steam temperature fed to the steam turbine, a measured value or an estimated value of a rotor temperature of the steam turbine, and a measured value of a casing temperature of the steam turbine, and output instruction values of the fuel flow rate adjusting valve and the steam flow rate adjusting valve, wherein:

the start control unit is configured to control the fuel flow rate adjusting valve and the steam flow rate adjusting valve so as to hold the steam temperature and the steam flow rate within predetermined ranges, when a difference between the steam temperature and the rotor temperature is a first regulated value or larger and a difference between the rotor temperature and the casing temperature is a second regulated value or larger, and thereafter, controls the steam flow rate adjusting valve so as to increase the steam flow rate while controlling the fuel flow rate adjusting valve so as to hold the steam temperature within the predetermined range, when the difference between the steam temperature and the rotor temperature becomes smaller than the first regulated value and the difference between the rotor temperature and the casing temperature is held at the second regulated value or larger.

8. A start control method for a combined cycle power generation plant having a gas turbine, an exhaust heat recovery boiler to generate steam using exhaust heat of the gas turbine, a steam turbine driven by the steam generated by the exhaust heat recovery boiler, a fuel flow rate adjusting valve to adjust a fuel flow rate fed to the gas turbine and a steam flow rate adjusting valve to adjust a steam flow rate fed from the exhaust heat recovery boiler to the steam turbine, wherein the start control method includes:

outputting instruction values of the fuel flow rate adjusting valve and the steam flow rate adjusting valve so as to hold a steam temperature and the steam flow rate within predetermined ranges, when a difference between the steam temperature fed to the steam turbine and a rotor temperature of the steam turbine is a first regulated value or larger and a difference between the rotor temperature and a casing temperature of the steam turbine is a second regulated value or larger, and outputting the instruction value of the steam flow rate adjusting valve so as to increase the steam flow rate while outputting the instruction value of the fuel flow rate adjusting valve so as to hold the steam temperature within the predetermined range, when the difference between the steam temperature and the rotor temperature becomes smaller than the first regulated value and the difference between the rotor temperature and the casing temperature is held at the second regulated value or larger.

* * * * *